(12) United States Patent
Sunil Kumar et al.

(10) Patent No.: US 11,536,846 B2
(45) Date of Patent: Dec. 27, 2022

(54) ELEVATION DETECTION SYSTEM FOR AUTONOMOUS VEHICLES AND A METHOD THEREOF

(71) Applicant: Wipro Limited, Bangalore (IN)

(72) Inventors: Balaji Sunil Kumar, Bengaluru (IN); Manas Sarkar, Barasat (IN)

(73) Assignee: Wipro Limited, Bangalore (IN)

( * ) Notice: Subject to any disclaimer, the term of this patent is extended or adjusted under 35 U.S.C. 154(b) by 981 days.

(21) Appl. No.: 16/281,135

(22) Filed: Feb. 21, 2019

(65) Prior Publication Data

US 2020/0209403 A1 Jul. 2, 2020

(30) Foreign Application Priority Data

Dec. 28, 2018 (IN) .............. 201841049645

(51) Int. Cl.
*G01C 3/08* (2006.01)
*G01S 17/931* (2020.01)
*G01S 7/481* (2006.01)

(52) U.S. Cl.
CPC .......... *G01S 17/931* (2020.01); *G01S 7/4813* (2013.01); *G01S 7/4817* (2013.01)

(58) Field of Classification Search
None
See application file for complete search history.

(56) References Cited

U.S. PATENT DOCUMENTS

| | | | |
|---|---|---|---|
| 5,754,099 A | 5/1998 | Nishimura et al. | |
| 8,825,391 B1 * | 9/2014 | Urmson et al. | G01C 21/00 |
| | | | 701/448 |
| 9,285,230 B1 * | 3/2016 | Silver et al. | G05D 1/00 |
| 9,555,803 B2 * | 1/2017 | Pawlicki et al. | B60Q 1/00 |
| 9,880,263 B2 | 1/2018 | Droz et al. | |
| 2017/0168146 A1 | 6/2017 | Boehmke | |
| 2019/0180502 A1 * | 6/2019 | Englard et al. | G06T 17/20 |

* cited by examiner

*Primary Examiner* — Mark Hellner
(74) *Attorney, Agent, or Firm* — Finnegan, Henderson, Farabow, Garrett & Dunner, LLP (57) ABSTRACT

The present disclosure relates to an elevation detection system for an Autonomous Vehicle (AV) and a method for detecting elevation of surrounding of the AV. The elevation detection system includes an elevation sensor unit and a computation unit. The elevation sensor unit is configured to detect an elevation of a plurality of objects having a lower most elevation, in the surrounding of the AV to determine a boundary elevation of the road. The elevation sensor unit is vertically movable within a range of vertical positions. A Light Detection and Ranging (LIDAR) sensor unit is associated with the elevation sensor unit, to detect the surrounding of the AV, having a predefined Field of View (FoV). The computation unit determines a lower limit value of the FoV and provides it to the LIDAR sensor unit for accurately detecting obstacles in the road.

12 Claims, 11 Drawing Sheets

| Sl. No | Condition | Minimum Elevation Data | Road Boundary Data | Additional Offset |
|---|---|---|---|---|
| 1 | Plain road | Previous instance data | Full stretch | No |
| 2 | Downward gradient | Previous instance data or settling at lower vertical position | Data between 180° – 150° | Yes |
| 3 | Upward gradient | When settled after vertically moved upward | Data between 180° – 130° | No |
| 4 | Speed-breaker | When settled after vertically moved upward | Full stretch | No |
| 5 | Objects | Before moving vertically upward | Scattered | No |

ELEVATION DETECTION SYSTEM FOR AUTONOMOUS VEHICLES AND A METHOD THEREOF

TECHNICAL FIELD

The present disclosure relates to Autonomous Vehicles (AV). More particularly, the present disclosure relates to an elevation detection system and a method for detecting lower most elevation of objects in a surrounding of the AV.

BACKGROUND

Autonomous Vehicles (AV) use various sensors like Light Detection and Ranging (LIDAR) sensor units, imaging units and the like to detect surrounding of the AV. The various sensors enable tracking of objects in the surroundings and vehicles on a road for the AV to navigate the road. The various sensors also detect pedestrian way or boundary of the road for the AV to remain on the road. In an AV, there is a possibility that a LIDAR sensor unit detects the road as an obstacle if it tries to process very low elevation points data without proper caution.

Conventional approaches adjust Field of View (FoV) of the LIDAR sensor unit to focus above certain height above the road. However, the certain height is arbitrarily determined and cannot be used for different terrain of road. Also, if an object is present below the lower viewing angle, such objects are not detected by the LIDAR sensor unit.

Thus, there is a need to determine a lower viewing angle of the LIDAR sensor unit for efficient object tracking.

The information disclosed in this background of the disclosure section is only for enhancement of understanding of the general background of the invention and should not be taken as an acknowledgement or any form of suggestion that this information forms the prior art already known to a person skilled in the art.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

In an embodiment, the present disclosure relates to an elevation detection system for an Autonomous Vehicle (AV) and a method for detecting elevation of surrounding of the AV. The elevation detection system includes an elevation sensor unit and a computation unit. The elevation sensor unit is configured to detect an elevation of a plurality of objects having a lower most elevation, in the surrounding of the AV. The lower most elevation of the plurality of objects is detected to determine a boundary elevation (pedestrian way) of a road. The elevation sensor is vertically movable within a range of vertical positions. In an embodiment, a Light Detection and Ranging (LIDAR) sensor unit in the AV is associated with the elevation sensor unit. The LIDAR sensor unit is configured to detect the surrounding of the AV. The LIDAR sensor unit may have a predefined Field of View (FoV).

In an embodiment, the computation unit is configured to move the elevation sensor unit in different vertical positions for detecting the lower most elevation of the plurality of objects. Further, the computation unit is configured to receive data related to the elevation of the plurality of objects and the boundary elevation of the road. The computation unit then determines a lower limit value for the FoV of the LIDAR sensor unit based on the lower most elevation of the plurality of objects and the boundary elevation of the road, observed at different vertical positions. Thereafter, the computation unit provides the lower limit value of the FoV to the LIDAR sensor unit, where the LIDAR sensor unit disregards one or more objects from the plurality of objects lying below the lower limit value of the FoV as obstacles.

In an embodiment, the method includes detecting an elevation of a plurality of objects with a lower most elevation in a surrounding of the AV to determine a boundary elevation of a road. The elevation of the plurality of objects are detected using an elevation sensor unit. The method further includes moving the elevation sensor unit to different vertical positions for detecting lower most elevation of the plurality of objects. Further, the lower most elevation of the plurality of objects is received from different vertical positions of the elevation sensor unit. Thereafter, a lower limit value for FoV of a LIDAR sensor unit of the AV is determined. Lastly, the lower limit value is provided to the LIDAR sensor unit, where the LIDAR sensor unit disregards one or more objects below the lower limit value as obstacles.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "includes", "comprising", or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "includes ... a" does not, without more constraints, preclude the existence of other elements or additional elements in the system or apparatus.

Embodiments of the present disclosure relate to an elevation detection system for an Autonomous Vehicle (AV) and a method for detecting elevation of a plurality of objects in surrounding of the AV.

Figure 1:
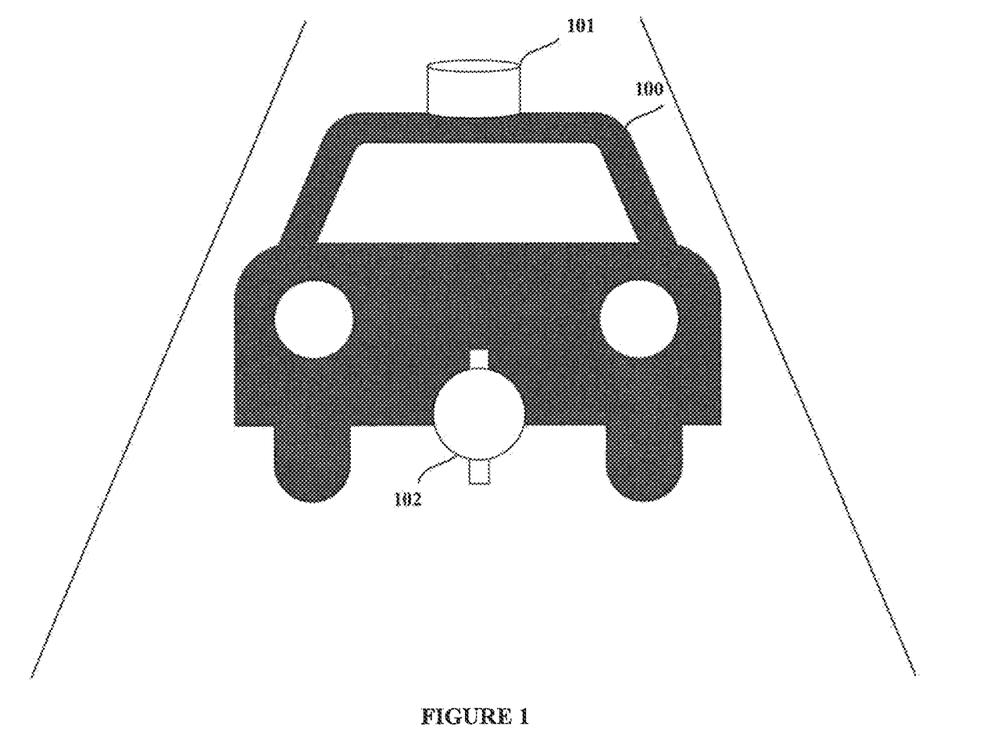
FIG. 1 illustrates an Automatic Vehicle (AV) having an elevation sensor unit for detecting elevation of surrounding, in accordance with an embodiment of the present disclosure.

FIG. 1 illustrates an AV (100). The AV includes a Light Detection and Ranging (LIDAR) sensor unit (101) and an elevation detection system (102). The AV (100) may navigate a road autonomously (without a driver). In an exemplary embodiment, the LIDAR sensor unit (102) may be configured to shoot pulsed laser rays in three dimensions to detect obstacles around the AV (100). In an embodiment, the LIDAR sensor unit (101) may shoot the pulsed laser rays towards the road and may consider the road as obstacle. In one embodiment, the LIDAR sensor unit (101) may be installed on top of the AV (100). In an embodiment, the LIDAR sensor unit (101) may be associated with a processor (not shown in FIG. 1). The processor may receive data measured by a LIDAR sensor and process the data to detect obstacles in the surrounding. In an embodiment, the LIDAR sensor unit (101) may be capable of identifying obstacles on the road and obstacles beyond the road boundary. The LIDAR sensor unit (101) may have a predefined Field of View (FoV) (viewing range) for measuring obstacles.

In an embodiment, the elevation detection system (102) may be configured to detect lower most elevation of a plurality of objects in the surrounding while maintaining safe distance from ground. The elevation detection system (102) may further be configured to determine a boundary elevation (elevation of a pedestrian way). In one embodiment, the elevation detection system (102) assesses boundary elevation for predetermined distance from the AV (100), for example 15-20 meters from the AV (100). In one embodiment, the elevation detection system (102) may be installed preferably in a front portion of the AV (100), for example, on a bonnet of the AV (100).

Figure 2:
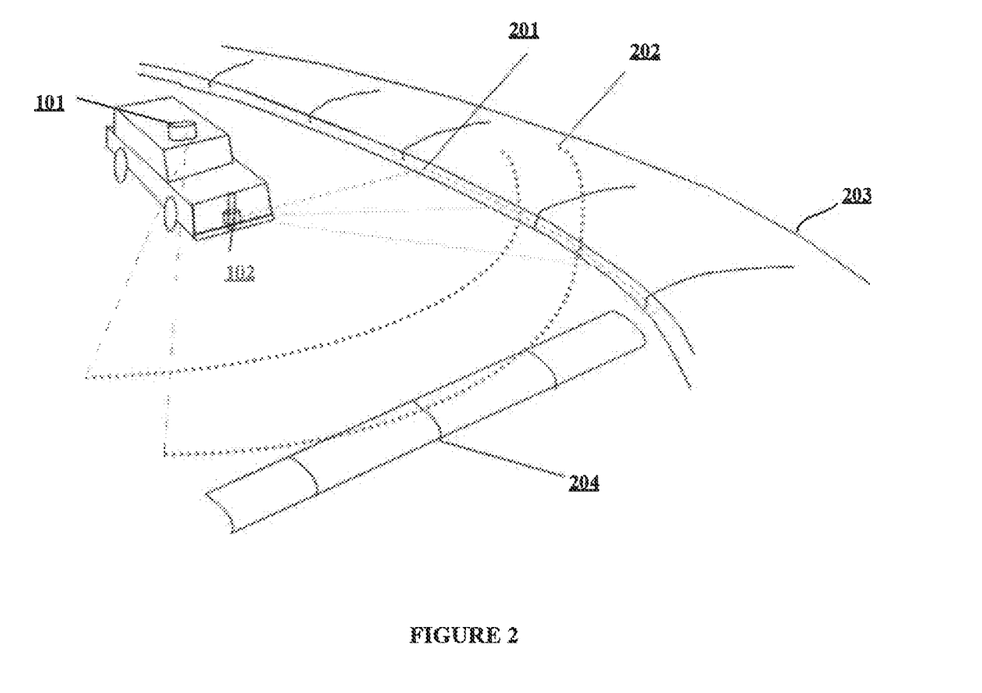
FIG. 2 illustrates scanning surrounding using a LIDAR sensor unit and an elevation sensor unit in an AV, in accordance with an embodiment of the present disclosure.

FIG. 2 illustrates simultaneous working of the LIDAR sensor unit (101) and the elevation detection system (102). As shown, the AV (100) may be navigating a road having a boundary or pedestrian way (203) and a speed-breaker (204). The LIDAR sensor unit (101) may shoot the pulsed laser rays (202) to detect obstacles as shown in the FIG. 2. The elevation detection system (102) may shoot laser beams (201) to detect boundary elevation as shown in the FIG. 2.

Figure 3:
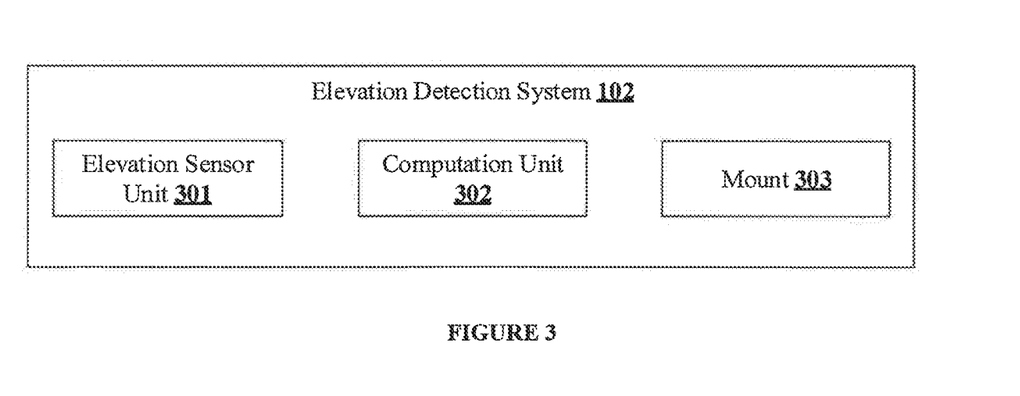
FIG. 3 shows a block diagram of an elevation detection system, in accordance with an embodiment of the present disclosure.

Reference is now made to FIG. 3. FIG. 3 shows an exemplary block diagram of the elevation detection system (102). The elevation detection system (102) includes an elevation sensor unit (301), a computation unit (302) and a mount (303).

In an embodiment, the elevation sensor unit (301) may be configured to shoot the laser beams. In one embodiment, the elevation sensor unit (301) may shoot the laser beams in two dimensions. In one embodiment, the elevation sensor unit (301) may be a laser sensor. In another embodiment, the elevation sensor unit (301) may be any suitable sensor capable of measuring elevation of objects. The present disclosure is described considering the elevation sensor unit (301) is a laser sensor. However, this should not be construed as a limitation and the principle behind working of the elevation sensor unit (301) may be the same with any other suitable sensor. In an embodiment, the elevation sensor unit (301) may be a digital sensor or an analog sensor. In an embodiment, the elevation sensor unit (301) may be mechanically mounted on the mount (303) which in turn is fixed to the bonnet of the AV (100). In one embodiment, the elevation sensor unit (301) may be removed from the mount (303). In one embodiment, the mount (303) may be removed from the AV (100) and may be fixed in a different position in the AV (100). In one embodiment, a vertical sliding mechanism may be provided in the mount to enable vertical movement of the elevation sensor unit (301). The vertical sliding mechanism may enable a smooth sliding or sliding in predefined steps in upward and downward direction.

In an embodiment, the computation unit (302) may be associated with the elevation sensor unit (301). The computation unit (302) may be configured to receive data points (elevation) measured by the elevation sensor unit (301) and determine elevation of the plurality of objects in the surrounding. In an embodiment, the computation unit (302) may be configured to move the elevation sensor unit (301) to different vertical positions to measure the elevation at different vertical positions. In an embodiment, the elevation sensor unit (301) is moved to different vertical positions to detect elevation of different objects. For example, for measuring elevation of a first object of height 2 feet, the elevation sensor unit (301) may be positioned in a certain vertical position (for example, position 1). Likewise, for measuring elevation of a second object having a height of 1.5 feet, the elevation sensor unit (301) is moved vertically downward (for example, position 2). In an embodiment, the vertical sliding mechanism may be electronically controlled by the computation unit (302). The computation unit (302) may be configured to move the elevation sensor unit (301) to different vertical positions to measure elevation of the plurality of objects to determine the boundary elevation. Upon moving the elevation sensor unit (301) to different vertical positions, the computation unit (302) is configured to receive data related to the elevation of the plurality of objects from the different vertical positions. Based on the received data, the boundary elevation is determined. Further, based on the boundary elevation and the elevation of the plurality of objects, a lower limit value of the FoV of the LIDAR sensor unit (101) is determined. The lower limit value of the FoV indicates that any object lying below the lower limit value may not be considered as obstacle by the LIDAR sensor unit (101). For example, if the road includes a speed-breaker, ideally, the LIDAR sensor unit (101) should not consider the speed-breaker as an obstacle. Hence, the lower limit value of FoV is determined by the elevation detection system (102) and provided to the LIDAR sensor unit (101). In one embodiment, the LIDAR sensor unit (101) may disregard data points collected below the lower limit value for obstacle detection. In another embodiment, the LIDAR FoV may be adjusted accordingly to validate LIDAR points above the lower limit value.

Figure 4A:
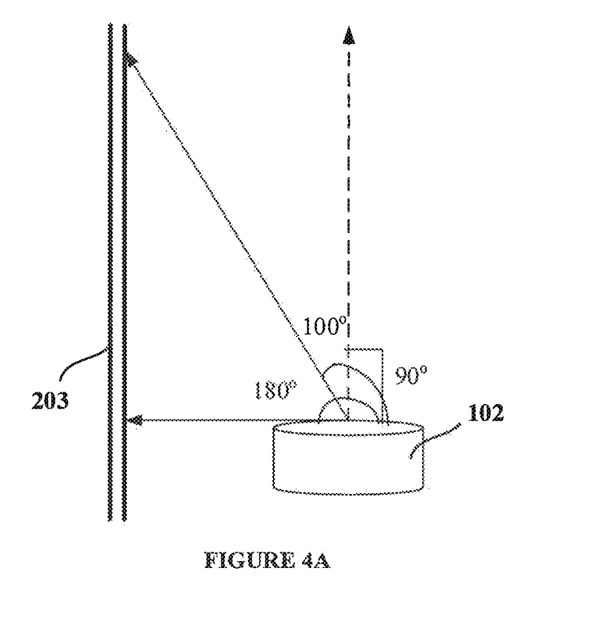
FIG. 4A illustrates a top view of an elevation sensor unit, in accordance with an embodiment of the present disclosure.
Figure 4B:
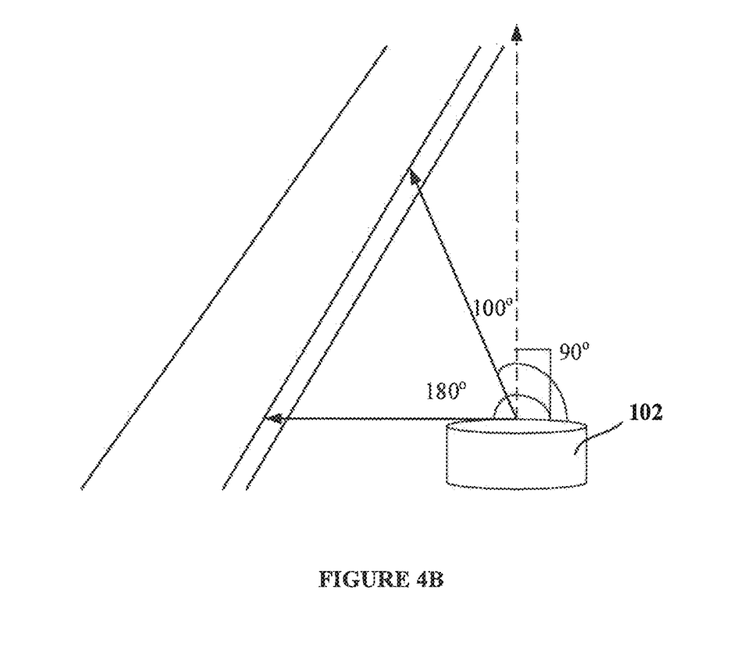
FIG. 4B illustrates a perspective view of an elevation sensor unit, in accordance with an embodiment of the present disclosure.

FIG. 4A illustrates working of the elevation detection system (102) from a top view. As shown, the elevation sensor unit (301) of the elevation detection system (102) may shoot laser beams in two dimensions. A reference direction (90°) (dotted line) is indicated in the FIG. 4A. In one embodiment, the elevation detection system (102) may consider boundary elevation as a reference elevation. Therefore, the elevation detection system (102) may be vertically positioned to measure a surface of the boundary (pedestrian way (203)). The elevation detection system (102) may project the laser beams at different angles from the reference direction, for example 180° and 100° from the reference direction. The laser beams are projected at different angles to determine a gradient of the road. According to the gradient of the road, the vertical position of the elevation sensor unit (301) is adjusted. FIG. 4B shows a perspective view of working of the elevation detection system (102).

Figure 5:
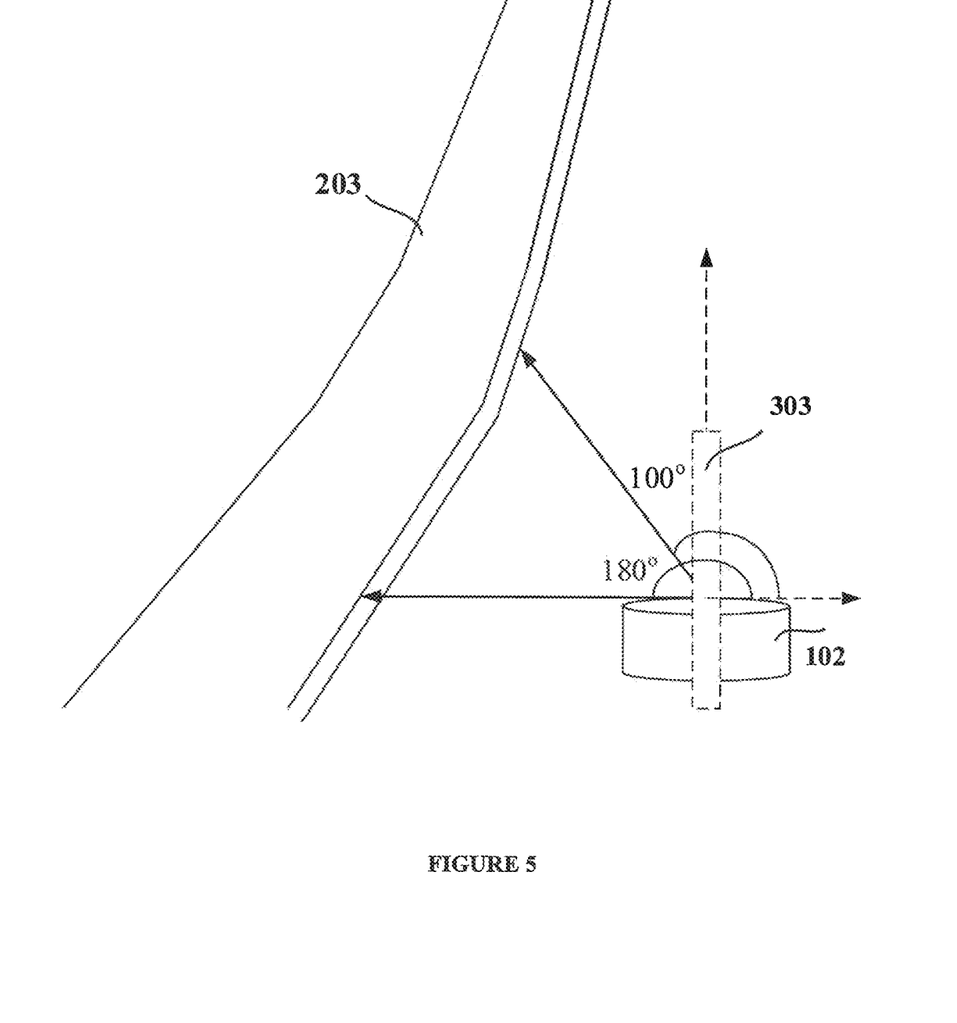
FIG. 5 illustrates a perspective view of operating an elevation sensor unit in an uphill road gradient, in accordance with an embodiment of the present disclosure.

FIG. 5 illustrates working of the elevation detection system (102) in an up-hill road gradient. As shown in the FIG. 5, in an up-hill road gradient, a laser beam portion projected from 00 to 1800 may detect the surface of the pedestrian way (203). However, if the laser beam portion is projected at 1000, the laser beam may not detect the surface of the pedestrian way (203) but may detect elevated road. Therefore, the elevation detection system (102) may be vertically moved upward to detect the surface of the pedestrian way (203) in the up-hill road gradient. Thereafter, the lower limit value may be calculated based on the vertical position of the elevation detection system and the data collected by the elevation detection system (102) from the vertical position. In an embodiment, as the road gradient increases the vertical position of the elevation detection system (102) may be changed accordingly and the lower limit value of the FoV of the LIDAR sensor unit may be calculated.

Figure 6A:
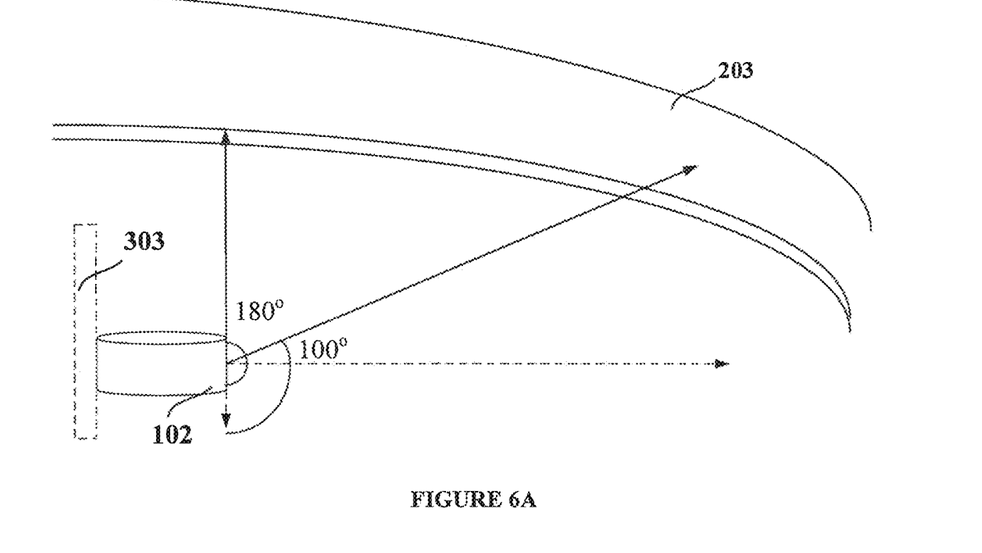
FIG. 6A and FIG. 6B illustrate a perspective view of operating an elevation sensor unit in a downhill road gradient, in accordance with an embodiment of the present disclosure.
Figure 6B:
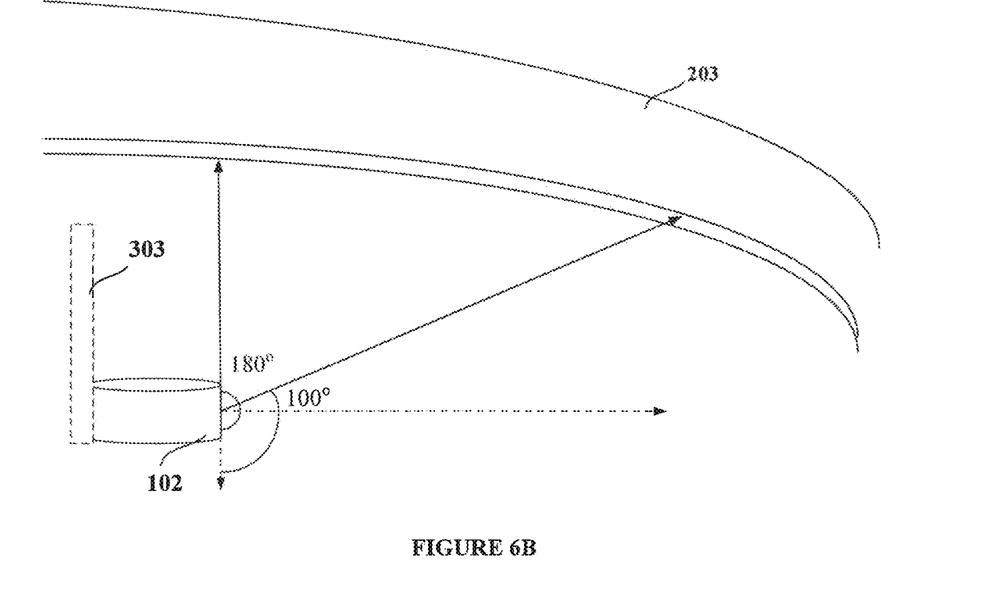

FIG. 6A illustrates working of the elevation detection system (102) in a down-hill road gradient. As shown in the FIG. 6A, at 180° from the reference line, the laser beam detects the surface of the pedestrian way (203). However, at 1000, the laser beam may be project over the pedestrian way (203) due to the down-hill road gradient and may detect any other object FIG. 6B illustrates that when the elevation detection system (102) is vertically lowered, the laser beam projected at 100° may detect the surface of the pedestrian way (203). Accordingly, the lower limit value of FoV may be calculated. In an embodiment, if the road gradient is more and even after moving the elevation detection system (102) to the lowest vertical position, the pedestrian way (203) is not detected at 100° is not detected, then an additional offset (occasional offset) is determined for the lower limit value of the FoV. In one embodiment, the additional offset may be arbitrarily chosen or may be dynamically estimated for the road.

Figure 7A:
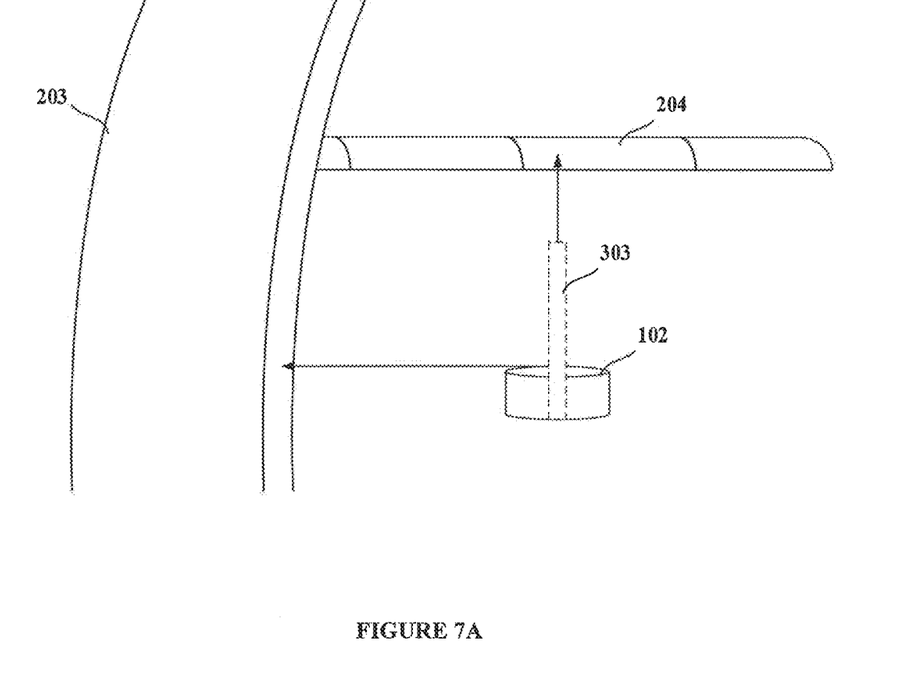
FIG. 7A and FIG. 7B illustrate a perspective view of operating an elevation sensor unit in presence of a speed breaker on a road, in accordance with an embodiment of the present disclosure.
Figure 7B:
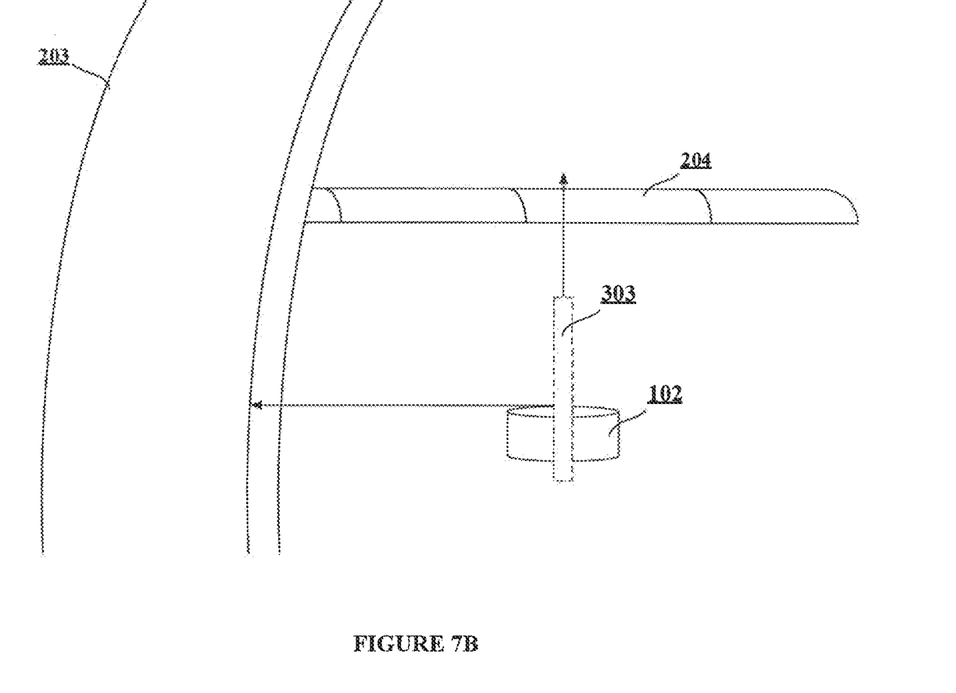
Figure 8:
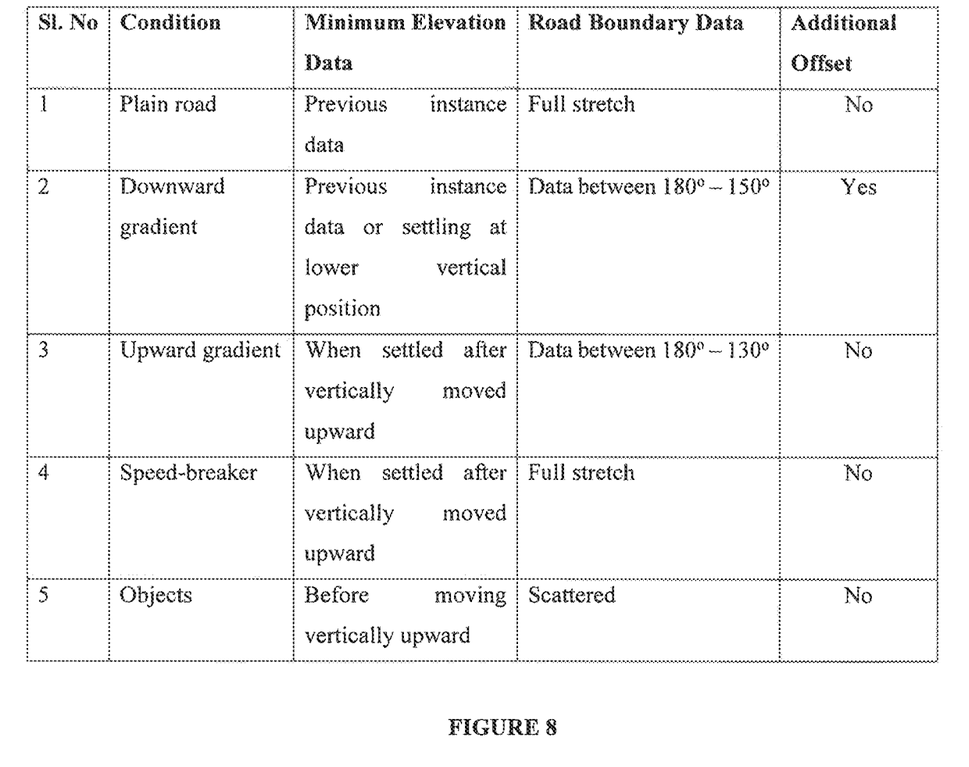
FIG. 8 shows a table illustrating detecting elevation for different road condition, in accordance with an embodiment of the present disclosure.

FIG. 7A illustrates working of the elevation detection system (102) in presence of a speed-breaker (204). As shown in FIG. 7A, in presence of a speed-breaker (204), the elevation detection system (102) detects the elevation of the speed-breaker (204). As described earlier, the boundary elevation is considered as reference and the elevation of the speed-breaker (204) is compared with the boundary elevation. In FIG. 7A, the elevation of the speed-breaker (204) is less than the boundary elevation. In order to measure this elevation of the speed-breaker (204), the elevation detection system (102) is vertically lowered. Upon comparison, if the elevation of the speed-breaker (204) is less than the boundary elevation, the elevation detection system (102) is vertically moved upward to detect the surface of the pedestrian way (203), as shown in FIG. 7B so that the speed-breaker (204) though at higher elevation than road surface, is disregarded as an obstacle. In an embodiment, any object on the road which may be have an elevation higher than the boundary elevation may be considered as an obstacle and should not be interpreted for calculating lowest elevation. In an embodiment, FIG. 8 illustrates the lower limit calculation in different scenarios as illustrated in FIG. 5, FIG. 6A, FIG. 6B, FIG. 7A and FIG. 7B. As seen from the FIG. 8, an additional offset is determined in the scenario where the road gradient is a downward slope. In an embodiment, the additional offset may be an arbitrary estimation or may be calculated based on the slope of the road. The additional offset is determined as the elevation sensor unit (301) is incapable of determining the elevation of the pedestrian way (203) due to the downward slope. Therefore, the lower limit value may not be calculated accurately. However, the additional offset is not required in other road gradients (plane road, upward slope, road having a speed breaker (204)) as the elevation sensor unit (301) can measure the elevation of the pedestrian way (203), thereby calculating accurate lower limit value.

Figure 9:
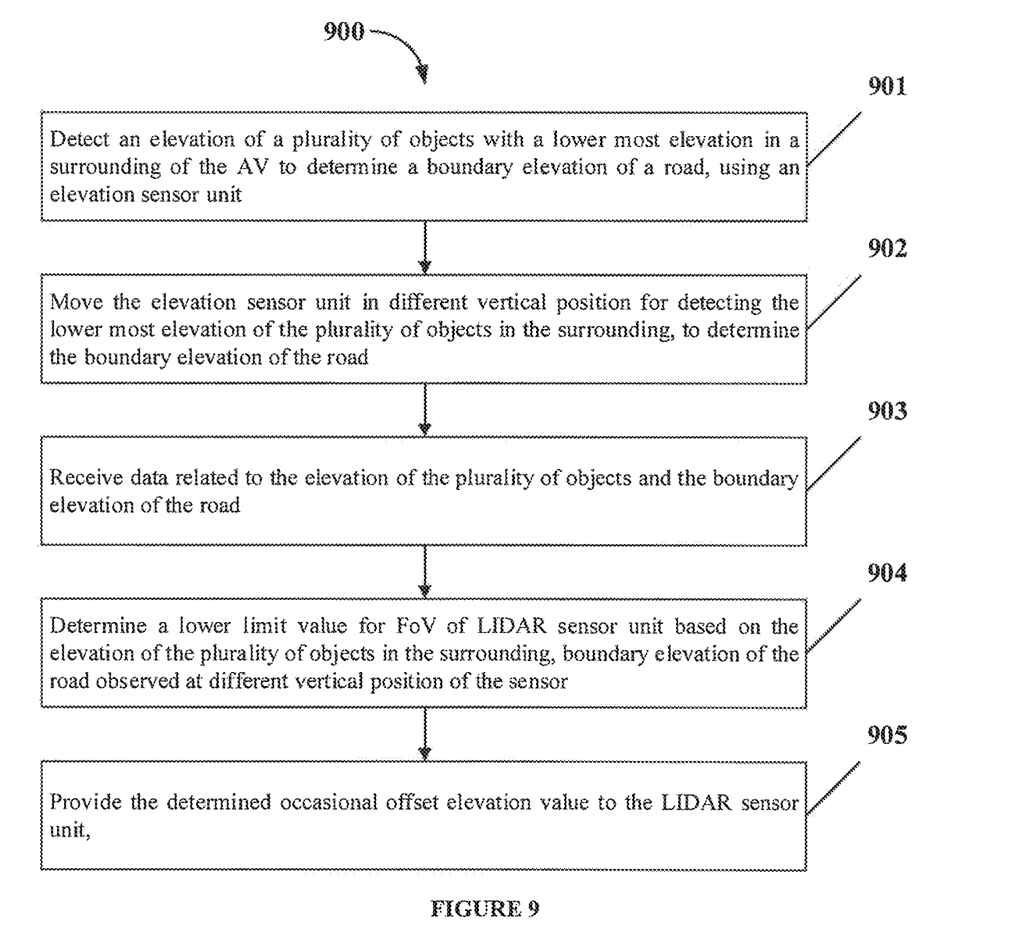
FIG. 9 illustrates method steps for detecting elevation of a plurality of objects in surroundings of AV, in accordance with an embodiment of the present disclosure.

FIG. 9 shows a flow chart illustrating a method for detecting elevation of plurality of objects in surrounding of AV (100), in accordance with some embodiments of the present disclosure.

As illustrated in FIG. 9, the method 900 may include one or more steps for detecting elevation of plurality of objects in surrounding of AV (100), in accordance with some embodiments of the present disclosure. The method 900 may be described in the general context of computer executable instructions. Generally, computer executable instructions can include routines, programs, objects, components, data structures, procedures, modules, and functions, which perform particular functions or implement particular abstract data types.

The order in which the method 900 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step 901, the elevation sensor unit (301) detects elevation of the plurality of objects in the surrounding of the AV (100) to determine the boundary elevation.

At step 902, the computation unit (302) moves the elevation sensor unit (301) to different vertical positions to detect the elevation of the plurality of objects, based on road gradient and the plurality of objects.

At step 903, the computation unit (302) receives data related to the elevation of the plurality of objects and the boundary elevation.

At step 904, the computation unit (302) determines the lower limit value of the FoV of the LIDAR sensor unit (101) based on the elevation of the plurality of objects and the boundary elevation.

At step 905, the computation unit (302) provides the lower limit value to the LIDAR sensor unit (101). The LIDAR sensor unit (101) may discard the data related to objects lying below the lower limit value.

Figure 10:
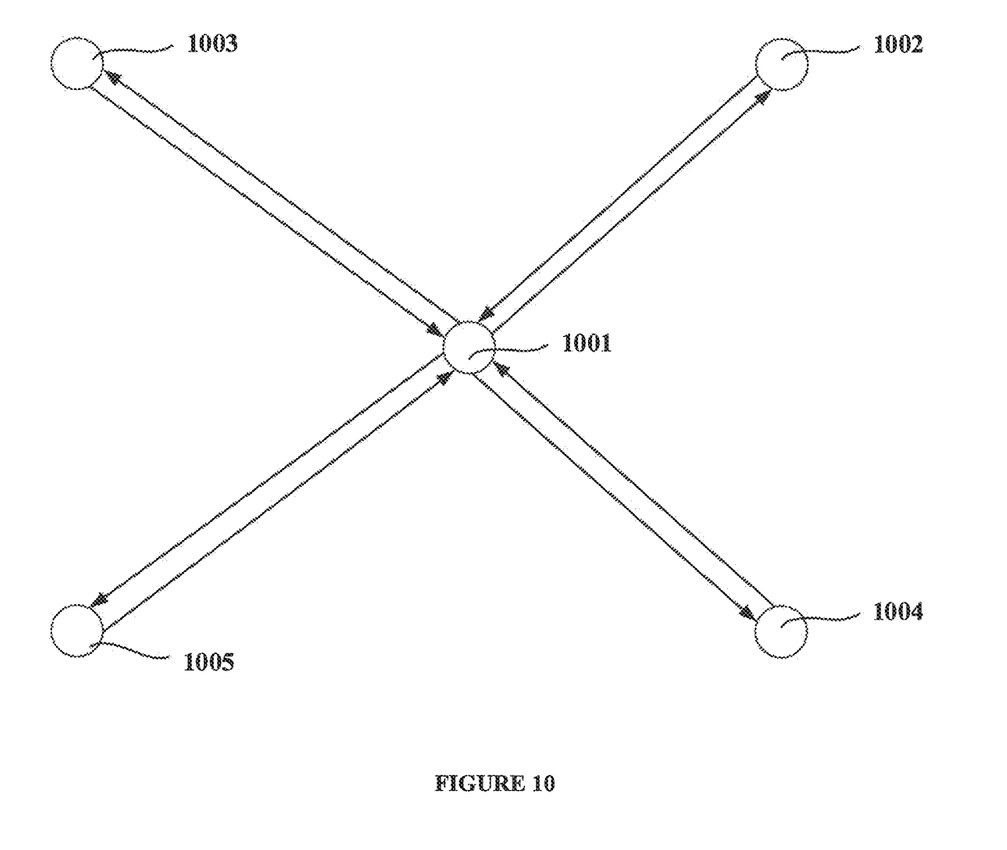
FIG. 10 illustrates a state transition for calculating elevation of a road in different road conditions, in accordance with an embodiment of the present disclosure.

FIG. 10 shows a state diagram illustrating transitions between states of detecting elevation of surrounding of AV. State 1 (1001) represents a stable state. State 2 (1002), state 3 (1003), state 4 (1004) and state 5 (1005) may be temporary states which occur due to change in road gradient or obstacles on the road. A transition between any of the states (1002, 1003, 1005 or 1005) may always happen via the stable state (1001). In one embodiment, the state 1 (1001) may represent plane road gradient, state 2 (1002) may represent downward road gradient, state 3 (1003) may represent upward road gradient), state 4 (1004) may represent a speed breaker on the road and state 5 (1005) may represent obstacle on the road.

Figure 11:
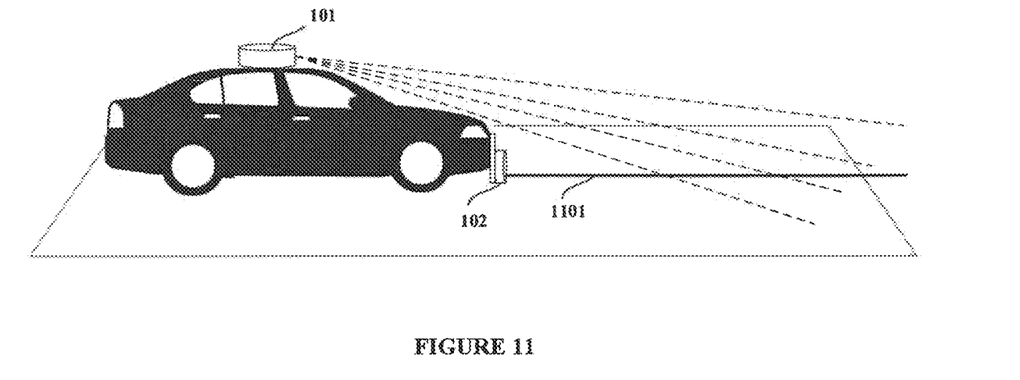
FIG. 11 shows a diagram indicating a lower limit value for the LIDAR sensor unit for detecting plurality of obstacles in the surrounding of the AV, in accordance with an embodiment of the present disclosure.

FIG. 11 illustrates a scenario where the elevation detection system (102) has determined a lower limit value (1101). In this scenario, the lower limit value (1101) is provided to the LIDAR sensor unit (101). The LIDAR sensor unit (101) receives the lower limit value (1101) and is used during processing of the data measured by the LIDAR sensor unit (101). Generally, the LIDAR sensor unit (101) is configured to measure the plurality of objects in the FoV of the LIDAR sensor unit (101) and process the plurality of objects to determine obstacles. As shown in FIG. 11, the elevation detection system (102) determines the lower limit value (1101) as described in this disclosure. The determined lower limit value (1101) is used by the LIDAR sensor unit (101) where one or more objects detected below the lower limit value (1101) are discarded and are not processed to determine if the one or more objects are obstacles. Therefore, in contrast with conventional techniques of adjusting the LIDAR sensor unit (101), the proposed system and method provides a technique of determining elevation of the plurality of objects on the road accurately.

In an embodiment, the proposed system and method enables the LIDAR sensor unit (101) to accurately distinguish obstacles in the road and does not interpret it for calculating lowest elevation. In an embodiment, the proposed system and method reduces processing of unnecessary data, thus increasing efficiency of the AV (100).

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 9 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS:

| Reference number | Description |
| --- | --- |
| 100 | Autonomous vehicle |
| 101 | LIDAR sensor unit |
| 102 | Elevation detection system |
| 201 | Laser beams |
| 202 | Pulsed laser rays |
| 203 | Pedestrian way |
| 204 | Speed-breaker |
| 301 | Elevation sensor unit |
| 302 | Computation unit |
| 303 | Mount |

What is claimed is:

1. An elevation detection system for an Autonomous Vehicle (AV), comprising:
    an elevation sensor unit configured to detect an elevation of a plurality of objects with a lower most elevation in a surrounding of the AV to determine a boundary elevation of a road, wherein the elevation sensor unit is vertically movable within a range of vertical positions, wherein the elevation sensor unit is configured to shoot laser beams at different angles to determine road gradient and boundary elevation, wherein the AV comprises a Light Detection and Ranging (LIDAR) sensor unit associated with the elevation sensor unit, and wherein the LIDAR sensor unit has a predefined Field of View (FoV) and is configured to detect the surrounding of the AV; and a computation unit configured to:
move the elevation sensor unit in different vertical positions based on the road gradient and the plurality of objects for detecting the lower most elevation of the plurality of objects in the surrounding to determine the boundary elevation of the road;
receive data related to the elevation of the plurality of objects from the different vertical positions and the boundary elevation of the road;
determine a lower limit value for the FoV of the LIDAR sensor unit based on the lower most elevation of the plurality of objects in the surrounding, the boundary elevation of the road observed at different vertical positions of the elevation sensor unit; and
provide the lower limit value to the LIDAR sensor unit, wherein the LIDAR sensor unit is configured to disregard one or more objects from the plurality of objects lying below the lower limit value of the FoV as obstacles.

2. The elevation detection system of claim 1, wherein the elevation sensor unit is placed on a mount attached to the AV, wherein the elevation sensor unit is moved vertically along the mount, and wherein the elevation sensor unit is detachable from the mount and the mount is detachable from the AV.

3. The elevation detection system of claim 1, wherein the elevation sensor unit enables the LIDAR sensor unit to determine the one or more objects among the plurality of objects lying above the lower limit value of the FoV as the obstacles.

4. The elevation detection system of claim 3, wherein the computation unit determines the lower limit value based on the plurality of objects in the surrounding.

5. The elevation detection system of claim 1, wherein the lower limit value is indicative of a lower boundary of accepting data points within the FoV for processing, wherein the data points are measured by the LIDAR sensor unit.

6. A method of detecting elevation of surroundings in an Autonomous Vehicle (AV), the method comprising:
detecting, by an elevation sensor unit of the elevation detection system, an elevation of a plurality of objects with a lower most elevation in a surrounding of the AV to determine a boundary elevation of a road, wherein the elevation sensor unit is vertically movable within a range of vertical positions, wherein the elevation sensor unit is configured to shoot laser beams at different angles to determine the road gradient and boundary elevation, wherein the AV comprises a Light Detection and Ranging (LIDAR) sensor unit associated with the elevation sensor unit, and wherein the LIDAR sensor unit has a predefined Field of View (FoV) and is configured to detect the surrounding of the AV;
moving, by a computation unit of the elevation detection system, the elevation sensor unit in different vertical positions based on the road gradient and the plurality of objects for detecting the lower most elevation of the plurality of objects in the surrounding to determine the boundary elevation of the road;
receiving, by the computation unit, data related to the elevation of the plurality of objects from different vertical positions and the boundary elevation of the road;
determining, by the computation unit, a lower limit value for the FoV of the LIDAR sensor unit based on the lower most elevation of the plurality of objects in the surrounding, the boundary elevation of the road observed at different vertical positions of the elevation sensor unit; and
providing, by the computation unit, the determined the lower limit value to the LIDAR sensor unit, wherein the LIDAR sensor unit is configured to disregard one or more objects from the plurality of objects lying below the lower limit value of the FoV as obstacles.

7. The method of claim 6, comprises moving the elevation sensor unit vertically along a mount attached to the AV.

8. The method of claim 6, wherein the lower limit value enables the LIDAR sensor unit to determine one or more objects among the plurality of objects lying above the lower limit value of the FoV as obstacles.

9. The method of claim 8, comprises determining the lower limit value based on the plurality of objects in the surrounding.

10. The method of claim 6, wherein the lower limit value is indicative of a lower boundary of accepting data points within the FoV for processing, wherein the data points are measured by the LIDAR sensor unit.

11. The elevation detection unit of claim 1, wherein an additional offset is determined for the lower limit value of the FOV for the LIDAR sensor unit when the road gradient is detected, and the boundary elevation cannot be detected by the elevation sensor unit adjusted at lowest vertical position.

12. The elevation detection unit of claim 1, wherein the computation unit is configured to electronically control the vertical sliding mechanism of the elevation sensor unit along the mount.

* * * * *